(12) United States Patent
Luo et al.

(10) Patent No.: US 9,966,826 B2
(45) Date of Patent: May 8, 2018

(54) MOTOR

(71) Applicant: NINGBO SEAGO ELECTRIC CO., LTD, Ningbo (CN)

(72) Inventors: Ning Luo, Ningbo (CN); Yanzhong Cai, Ningbo (CN); Huiming Liu, Ningbo (CN)

(73) Assignee: Ningbo Seago Electric Co., Ltd., Ningbo (CN)

( * ) Notice: Subject to any disclaimer, the term of this patent is extended or adjusted under 35 U.S.C. 154(b) by 284 days.

(21) Appl. No.: 14/725,659

(22) Filed: May 29, 2015

(65) Prior Publication Data
US 2016/0218576 A1 Jul. 28, 2016

(30) Foreign Application Priority Data
Jan. 27, 2015 (CN) .......................... 2015 1 0040257

(51) Int. Cl.
*H02K 33/00* (2006.01)
*H02K 33/16* (2006.01)

(52) U.S. Cl.
CPC .................... *H02K 33/16* (2013.01)

(58) Field of Classification Search
CPC ......... H02K 33/00; H02K 33/16; H02K 33/02
USPC ... 310/36, 37, 38, 39, 47, 15, 24, 12.33, 89, 310/91
See application file for complete search history.

(56) References Cited

U.S. PATENT DOCUMENTS

| | | | | |
|---|---|---|---|---|
| 2,158,738 A * | 5/1939 | Baker | ................ | A61C 17/3418 15/145 |
| 8,587,162 B2 * | 11/2013 | Kagami | ................ | A61C 17/32 15/21.1 |
| 8,618,701 B2 * | 12/2013 | Takahashi | ............... | A61C 17/32 310/12.14 |
| 2004/0010871 A1 * | 1/2004 | Nishinaka | .......... | A61C 17/3445 15/22.2 |
| 2005/0235438 A1 * | 10/2005 | Motohashi | ............. | H02K 33/16 15/22.1 |
| 2011/0203061 A1 * | 8/2011 | Takahashi | ............... | A61C 17/32 15/22.1 |
| 2011/0214239 A1 * | 9/2011 | Kagami | ................ | A61C 17/32 15/22.1 |

(Continued)

FOREIGN PATENT DOCUMENTS

CN ZL201320543302.4 9/2013

*Primary Examiner* — Forrest M Phillips
(74) *Attorney, Agent, or Firm* — Schmeiser, Olsen & Watts, LLP

(57) ABSTRACT

The present invention discloses a motor, including an enclosure, a rotor part and a stator part, wherein the stator part includes an upper coil assembly and a lower coil assembly, the rotor part includes an elastic element, the enclosure includes an upper shell and a lower shell, the upper shell is provided with an upper installation groove, the lower shell is provided with a lower installation groove, one end of the elastic element is fixed by the enclosure, and the other end thereof is connected with the rotor part. The stator and the rotor adopt upper and lower structures, thus being simple in structure and convenient to detach and install, the coils are arranged on the stator, the rotor is of a permanent magnet structure capable of providing a larger air-gap magnetic flux density, and the elastic element ensures very smooth reciprocating swing of the rotor part.

8 Claims, 5 Drawing Sheets

(56) References Cited

U.S. PATENT DOCUMENTS

2013/0207575 A1\* 8/2013 Bax .................. A61C 17/3418
  318/128
2014/0292110 A1\* 10/2014 Tang .................. H02K 41/031
  310/12.02
2017/0098988 A1\* 4/2017 Barbet .................. H02K 33/16

\* cited by examiner

MOTOR

FIELD OF THE INVENTION

The present invention belongs to the field of oscillating motors, and particularly relates to a motor.

BACKGROUND OF THE INVENTION

With the improvement of living standards of consumers, the requirements of people for the quality and performance of electric toothbrushes are increasingly higher, but because of cost considerations, many products on the market are achieved by traditional micro motors and vibrating rings at present, which have the defects of unstable working frequency, poor vibration effect and dependency on battery voltages to a large extent. Although some special oscillating motors appear on the market, the structures are complicated in general, the consistency is poor and a non-oscillatory effect is liable to occur, thus the special oscillating motors are not suitable for mass promotion.

Chinese patent ZL201320543302.4 discloses a vibrating motor for an electric toothbrush, inductance coils are arranged on a rotor of the vibrating motor, four permanent magnets are respectively installed in the inner cavities of brackets on both sides, and the output rear end of a rotating shaft lever and a rear cover are positioned by a spring positioning pin. The polarity is changed by changing the square wave pulse of the coils to generate an alternate oscillating magnetic field of N, S poles in the coils, in order to drive the rotor to generate a rotational vibration effect. The above-mentioned structure has the defects that, the coils are arranged on the rotor, when the motor is at work, the generated vibration will loosen the coils, and a lead is difficult to arrange. In addition, an enclosure of the motor on the current market is integrated, during installation, a stator is basically installed on the enclosure at first, then the rotor is inserted in the enclosure, and finally the enclosure is sealed to finish the installation. This installation manner is very complicated and is very inconvenient to maintain. When the stator needs to be maintained and replaced, the next operation can only be performed after the rotor is detached.

The current rotor part mainly rotates under the action of a magnetic thrust to generate an angle with the position under the stationary state thereof, then the current direction of the motor changes to change the direction of the magnetic thrust, in this way, the rotor part can reversely rotate in cycles, and the rotor part is located in a reciprocating swing movement. In this case, a condition is generated that after rotating to an angle, the rotor part forms an included angle with the magnetic thrust, when the included angle is quite large, the component force of the magnetic thrust for propelling the rotation of the rotor part is greatly deceased, as a result, it is very difficult to drive the rotor part to rotate. In this case, in a reciprocating swing process, the rotor part is not smooth enough and is bumpy.

Thus a motor is needed on the market, whose rotor part can be located in a smooth reciprocating swing process.

SUMMARY OF THE INVENTION

Aiming at the defects in the prior art, the present invention provides a motor, which has a simple structure, coils are placed on a stator, a rotor part is of a permanent magnet structure, a larger air-gap magnetic flux density is provided, the mass is smaller, the dynamic response is fast, under the condition of providing equal ampere-turns current, the output torque is larger, moreover, the installation and detachment are very convenient, thus the assembly time can be saved and the time consumption in the subsequent maintenance and overhaul can be reduced.

To solve the above-mentioned technical problems, the present invention adopts the following technical solution: a motor, including an enclosure, a rotor part and a stator part, wherein the stator part includes an upper coil assembly and a lower coil assembly, the rotor part includes an elastic element, the enclosure includes an upper shell and a lower shell which are separate and independent, the upper shell is provided with an upper installation groove for installing the upper coil assembly, the lower shell is provided with a lower installation groove for installing the lower coil assembly, one end of the elastic element is fixed by the enclosure, and the other end of the elastic element is connected with the rotor part.

In the above technical solution, preferably, the upper shell and the lower shell are cooperatively provided with a bearing groove A and a bearing groove B, a bearing A and a bearing B are arranged on the rotor part, the bearing A and the bearing B are respectively installed in the bearing groove A and the bearing groove B, in order to install the rotor part in the enclosure in a rolling manner.

In the above technical solution, preferably, the stator part is of a symmetrical structure, the upper coil assembly includes an upper coil, an upper reel A, an upper silicon steel sheet and an upper reel B, the upper reel A and the upper reel B clamp the upper silicon steel sheet therebetween, the upper coil winds and fixes the upper reel A, the upper reel B and the upper silicon steel sheet into an entirety, the lower coil assembly includes a lower coil, a lower reel A, a lower silicon steel sheet and a lower reel B, the lower reel A and the lower reel B clamp the lower silicon steel sheet therebetween, and the lower coil winds and fixes the lower reel A, the lower reel B and the lower silicon steel sheet into an entirety.

In the above technical solution, preferably, the rotor part includes a fixing shaft, a connecting element A, a connecting element B, a magnet, an upper concentrating flux plate and a lower concentrating flux plate, the fixing shaft is fixedly connected with the connecting element A, the upper concentrating flux plate and the lower concentrating flux plate are fixedly arranged between the connecting element A and the connecting element B, the magnet is fixedly arranged between the upper concentrating flux plate and the lower concentrating flux plate, and the elastic element is arranged at the tail end of the rotor part.

In the above technical solution, preferably, the upper coil and the lower coil will generate a magnetic field after the current is switched on, when the switched-on current changes, a changing magnetic field will be generated to interact with the magnet, so as to drive the rotor part to rotate.

In the above technical solution, preferably, the center line of the fixing shaft and the center line of the stator part are located on the same straight line, and the center line of the magnet and the center line of the fixing shaft are located on the same straight line.

In the above technical solution, preferably, the circuits of the upper coil and the lower coil are connected in series or in parallel, and the directions of magnetic lines generated by the upper coil and the lower coil are uniform.

In the above technical solution, preferably, the upper concentrating flux plate and the lower concentrating flux plate are made of a magnetic conducting material, the upper silicon steel sheet and the lower silicon steel sheet are made of a magnetic conducting material, and the cross sections of the two are U-shaped.

In the above technical solution, preferably, the frequency at which the current is switched on to the upper coil and the lower coil is equal to or close to the resonance frequency of the rotor part.

In the present invention, the structure is simple, the coils are arranged on the stator, the rotor part is of a permanent magnet structure, a larger air-gap magnetic flux density is provided, the mass is smaller, and the dynamic response is fast. Under the condition of providing equal ampere-turns current, the output force of the present invention is much larger than the output force of the existing permanent magnet oscillating motor on the current market and can exceed twice according to multiple detections and calculations, in this way, a larger output torque can be ensured. The center of the rotor is concentric with the shaft, to ensure more reliable operation of the motor. Finally, both of the rotor part and the stator part of the present invention adopt upper and lower structures, thus the installation and detachment are simple and convenient, the assembly time can be saved, the time consumption in the subsequent maintenance and overhaul can be reduced, the efficiency is improved, the cost is lowered and the reliability of the motor is further improved. Moreover, the elastic element is arranged on the rotor part, due to the inherent properties, the elastic element assists the swing of the rotor part, such that the reciprocating swing of the rotor part is very smooth.

DETAILED DESCRIPTION OF THE EMBODIMENTS

Figure 1:
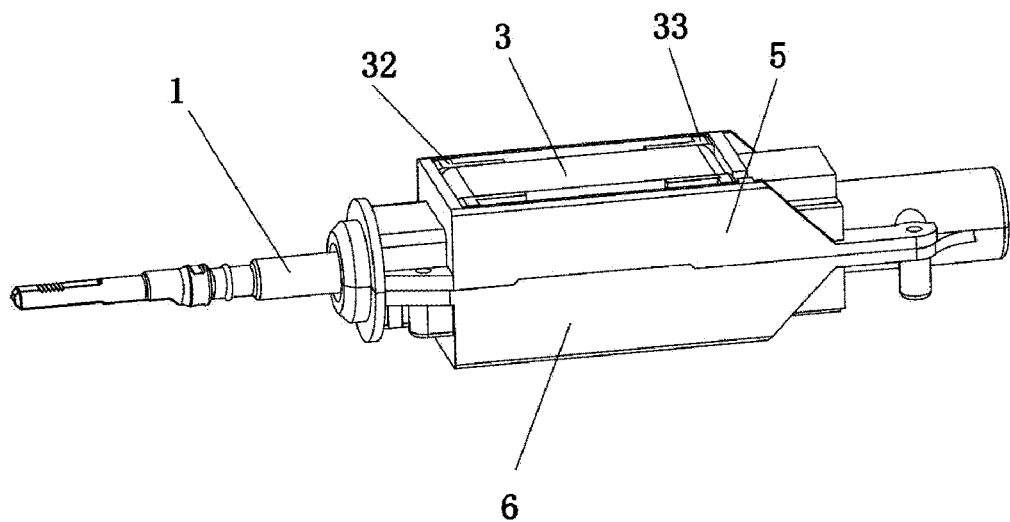
FIG. 1 is a stereoscopic view of the present invention.
Figure 2:
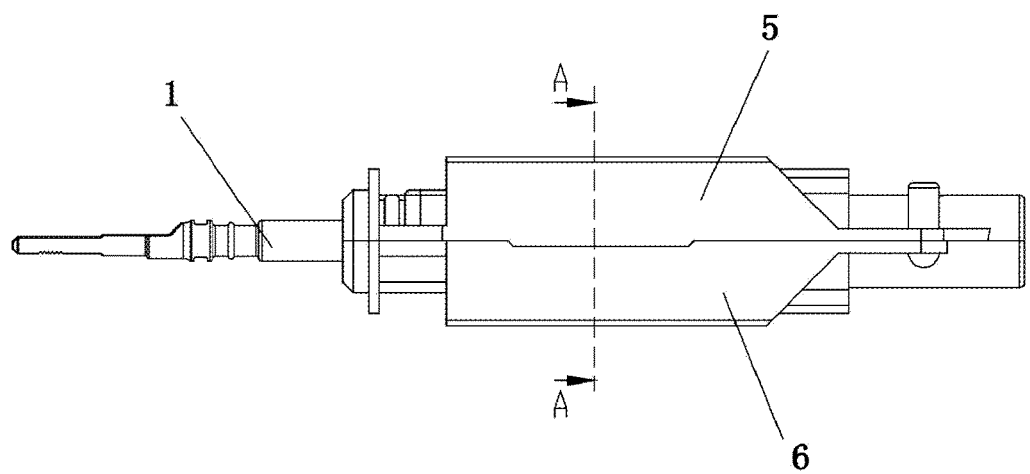
FIG. 2 is a front view of the present invention.
Figure 3:
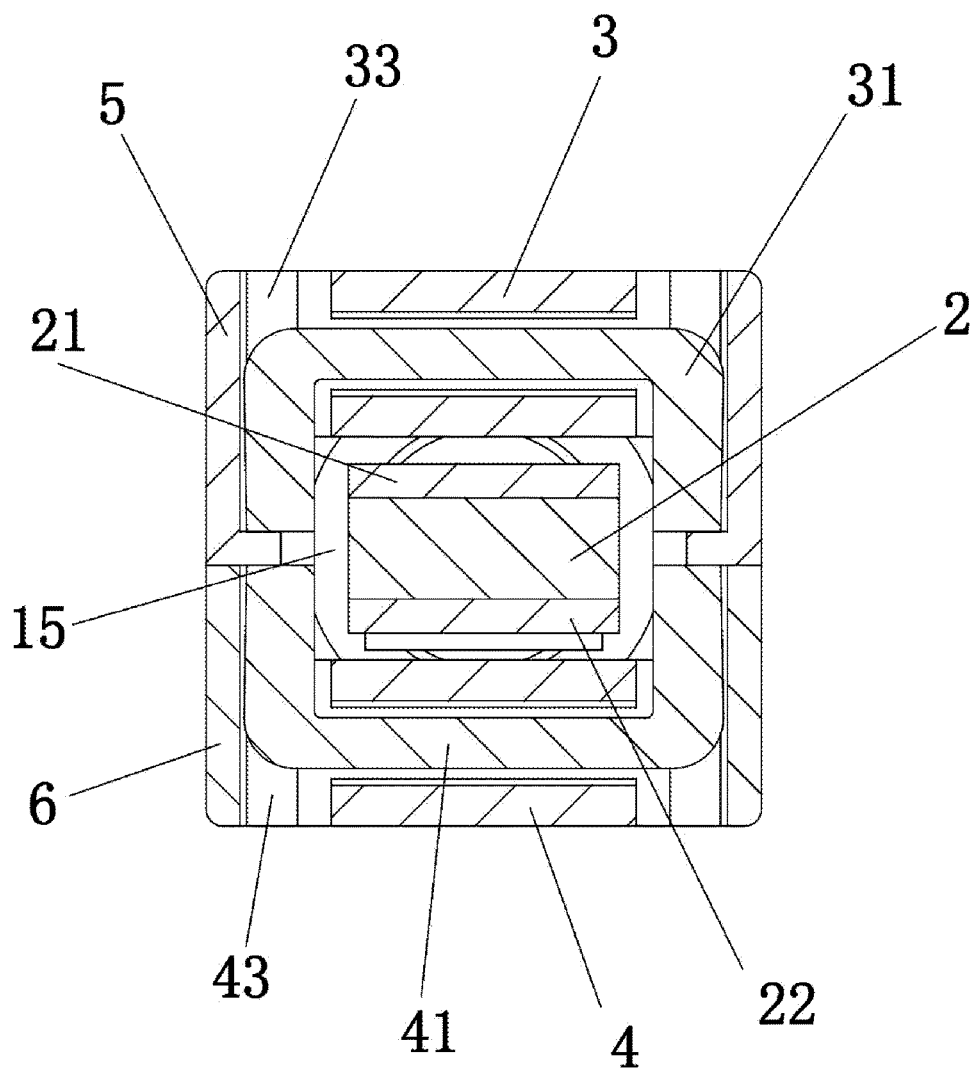
FIG. 3 is a cutaway view of an A-A direction of the front view as shown in FIG. 2.
Figure 4:
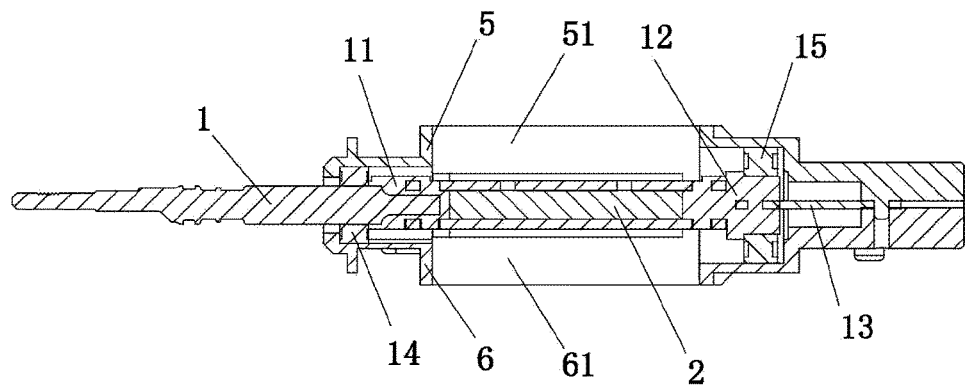
FIG. 4 is a cutaway view when no stator part is installed in the present invention.
Figure 5:
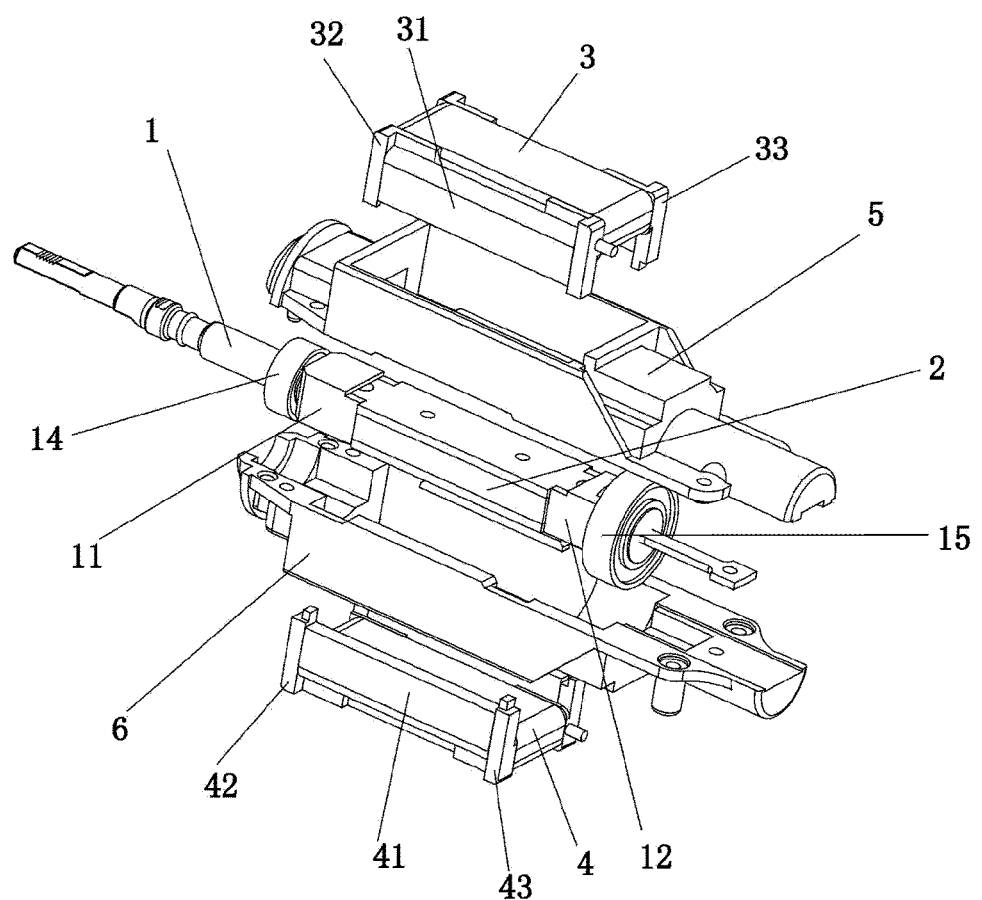
FIG. 5 is a stereoscopic exploded view of a structure of the present invention.
Figure 6:
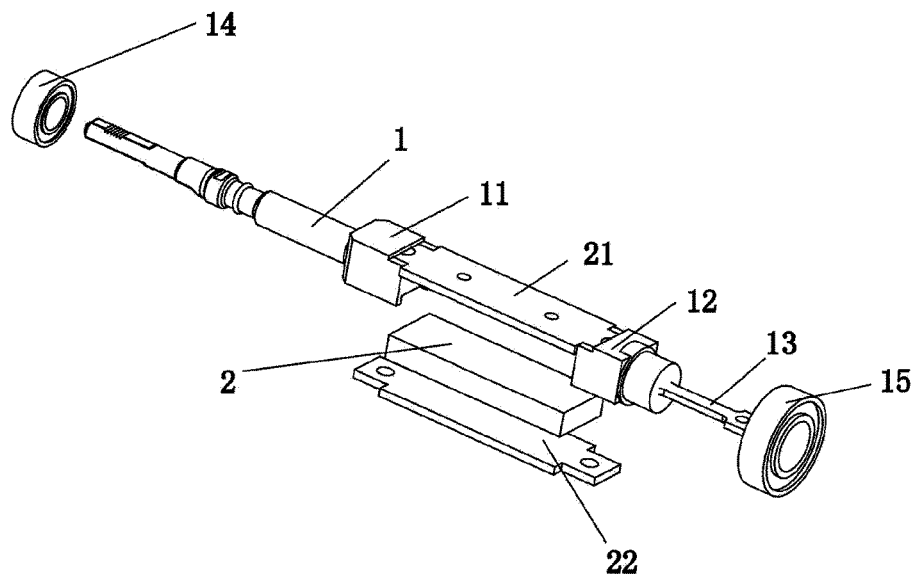
FIG. 6 is an exploded view of a rotor part of the present invention.
Figure 7:
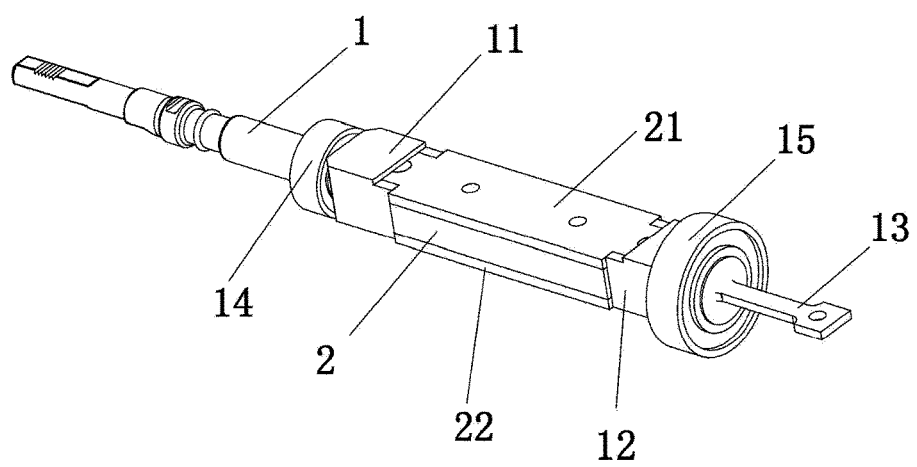
FIG. 7 is a stereoscopic view of a rotor part of the present invention.
Figure 8:
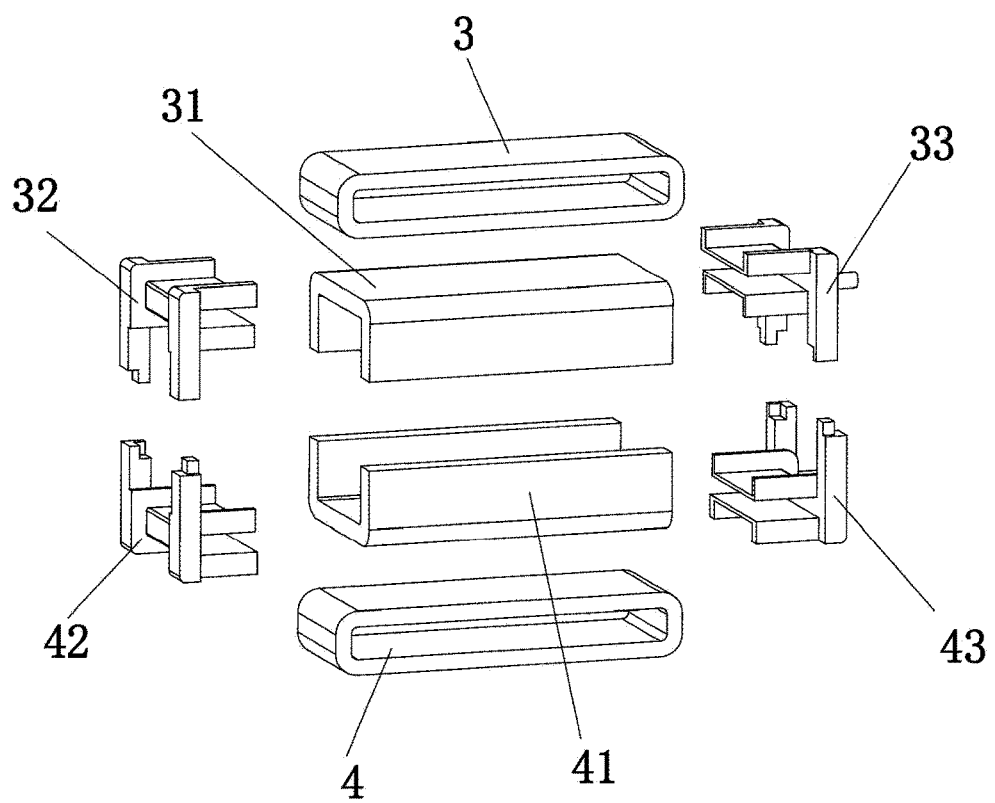
FIG. 8 is an exploded view of the stator part of the present invention.

A further detailed description of the present invention will be given below in combination with accompanying drawings and specific implementations: as shown in FIG. 1 to FIG. 8, a motor, including an enclosure, a rotor part and a stator part, wherein the stator part includes an upper coil assembly and a lower coil assembly, the rotor part includes an elastic element 13, the enclosure includes an upper shell 5 and a lower shell 6 which are separate and independent, the upper shell 5 is provided with an upper installation groove 51 for installing the upper coil assembly, the lower shell 6 is provided with a lower installation groove 61 for installing the lower coil assembly, one end of the elastic element 13 is fixed by the enclosure, and the other end of the elastic element is connected with the rotor part. The middle part of the elastic element is at an air isolation state. The rotor part rotates under the action of a magnetic thrust to generate an angle with the original position. Then, due to the inherent elasticity, the elastic element can drive the rotor to reset, the direction of the alternating current changes to change the magnetic thrust, in order to drive the rotor part to rotate in a direction opposite to the direction of the previous stage, and the elastic element drives the rotor part to reset in cycles to assist the swing of the rotor part.

The upper shell 5 and the lower shell 6 are cooperatively provided with a bearing groove A and a bearing groove B, a bearing A 14 and a bearing B 15 are arranged on the rotor part, the bearing A 14 and the bearing B 15 are respectively installed in the bearing groove A and the bearing groove B, in order to install the rotor part in the enclosure in a rolling manner.

The stator part is of a symmetrical structure, the upper coil assembly includes an upper coil 3, an upper reel A 32, an upper silicon steel sheet 31 and an upper reel B 33, the upper reel A 32 and the upper reel B 33 clamp the upper silicon steel sheet 31 therebetween, the upper coil 3 winds and fixes the upper reel A 32, the upper reel B 33 and the upper silicon steel sheet 31 into an entirety, the lower coil assembly includes a lower coil 4, a lower reel A 42, a lower silicon steel sheet 41 and a lower reel B 43, the lower reel A 42 and the lower reel B 43 clamp the lower silicon steel sheet 41 therebetween, and the lower coil 4 winds and fixes the lower reel A 42, the lower reel B 43 and the lower silicon steel sheet 41 into an entirety.

The rotor part includes a fixing shaft 1, a connecting element A 11, a connecting element B 12, a magnet 2, an upper concentrating flux plate 21 and a lower concentrating flux plate 22, the fixing shaft 1 is fixedly connected with the connecting element A 11, the upper concentrating flux plate 21 and the lower concentrating flux plate 22 are fixedly arranged between the connecting element A 11 and the connecting element B 12, the magnet 2 is fixedly arranged between the upper concentrating flux plate 21 and the lower concentrating flux plate 22, and the elastic element 13 is arranged at the tail end of the rotor part.

The upper coil 3 and the lower coil 4 will generate a magnetic field after the current is switched on, when the switched-on current changes, a changing magnetic field will be generated to interact with the magnet 2, so as to drive the rotor part to move.

The center line of the fixing shaft 1 and the center line of the stator part are located on the same straight line, and the center line of the magnet 2 and the center line of the fixing shaft 1 are located on the same straight line.

The circuits of the upper coil 3 and the lower coil 4 are connected in series or in parallel, and the directions of magnetic lines generated by the upper coil 3 and the lower coil 4 are uniform.

The upper concentrating flux plate 21 and the lower concentrating flux plate 22 are made of a magnetic conducting material, the upper silicon steel sheet 31 and the lower silicon steel sheet 41 are made of a magnetic conducting material, and the cross sections of the two are U-shaped.

The frequency at which the current is switched on to the upper coil 3 and the lower coil 4 is equal to or close to the resonance frequency of the rotor part.

The enclosures of the motors on the current market are integrated, the upper and lower structures in the present invention are not adopted, resulting in that the stator parts of these motors need to be installed in the enclosures at first, then the rotor parts are installed in the enclosures, and finally the ports of the enclosures are sealed to finish the installation. This installation method is very troublesome, the installation speed is low, and in subsequent overhaul, the next operation can only be performed after all devices are detached. In this case, the working progress is greatly delayed and the efficiency is reduced, resulting in raised cost.

The present invention is arranged in such a manner that the enclosure adopts the upper and lower structures and includes the upper shell 5 and the lower shell 6; the stator part adopts the upper and lower structures and includes the upper coil assembly and the lower coil assembly; the rotor part is arranged in the enclosure, and the magnet 2 on the rotor is clamped between the upper concentrating flux plate 21 and the lower concentrating flux plate 22; moreover, the upper shell 5 and the lower shell 6 are respectively provided with the upper installation groove 51 and the lower installation groove 61, the upper coil assembly is installed in the upper installation groove 51, and the lower coil assembly is installed in the lower installation groove 61. The upper and lower structures are adopted in the present invention, due to this arrangement, the upper coil assembly and the lower coil assembly of the stator part are very convenient to install and detach; moreover, it is very convenient to open the enclosure to detach and install the rotor part. Furthermore, due to this arrangement in the present invention, when maintaining the stator part, the enclosure may be not opened, thus reducing the procedure to improve the efficiency; when maintaining the rotor, the stator generates no blocking effect, thus being very convenient.

The motor provided by the present invention can be applied to electric equipment, wherein the electric equipment can be an electric toothbrush, a razor, a loudspeaker, an electric hammer machine, a blender, a freezer, a sewing machine, a packaging and strapping machine, an electromagnetic pump and the like, and will not be repeated redundantly herein one by one.

In the present invention, the structure is simple, the coils are arranged on the stator, the rotor part is of a permanent magnet structure, a larger air-gap magnetic flux density is provided, the mass is smaller, and the dynamic response is fast; under the condition of providing equal ampere-turns current, the output force of the present invention is much larger than the output force of the existing permanent magnet oscillating motor on the current market and can exceed twice according to multiple detections and calculations, in this way, a larger output torque can be ensured. The center of the rotor is concentric with the shaft, to ensure more reliable operation of the motor. Finally, both of the rotor part and the stator part of the present invention adopt upper and lower structures, thus the installation and detachment are simple and convenient, the assembly time can be saved, the time consumption in the subsequent maintenance and overhaul can be reduced, the efficiency is improved, the cost is lowered and the reliability of the motor is further improved. Moreover, the elastic element is arranged on the rotor part, due to the inherent properties, the elastic element assists the swing of the rotor part, such that the reciprocating swing of the rotor part is very smooth.

The foregoing embodiments merely express several implementations of the present invention, the descriptions are very specific and detailed, but could not be understood as limitation to the patent scope of the present invention. It should be noted that, those of ordinary skill in the art can make various deformations and improvements without deviating from the conception of the present invention, and these deformations and improvements shall fall within the protection scope of the present invention. Accordingly, the protection scope of the appended claims should prevail over the patent protection scope of the present invention.

The invention claimed is:

1. A motor, comprising an enclosure, a rotor part and a stator part, wherein the stator part comprises an upper coil assembly and a lower coil assembly, wherein the rotor part comprises an elastic element (13), the enclosure comprises an upper shell (5) and a lower shell (6) which are separate and independent, the upper shell (5) is provided with an upper installation groove (51) for installing the upper coil assembly, the lower shell (6) is provided with a lower installation groove (61) for installing the lower coil assembly, one end of the elastic element is fixed by the enclosure, and the other end of the elastic element is connected with the rotor part, and when the rotor part rotates, the elastic element drives the rotor part to reset, the stator part is of a symmetrical structure, the upper coil assembly comprises an upper coil (3) and an upper silicon steel sheet (31), and the lower coil assembly comprises a lower coil (4) and a lower silicon steel sheet (41), the rotor part comprises a magnet (2), an upper concentrating flux plate (21) and a lower concentrating flux plate (22), and the magnet (2) is fixedly arranged between the upper concentrating flux plate (21) and the lower concentrating flux plate (22), the upper concentrating flux plate (21), the magnet (2), and the lower concentrating flux plate (22) are configured to overlap in a first direction and extend in a second direction vertical to the first direction, the upper concentrating flux plate (21) and the lower concentrating flux plate (22) are made of a magnetic conducting material, the upper silicon steel sheet (31) and the lower silicon steel sheet (41) are made of a magnetic conducting material, and configured to sandwich the rotor part therebetween in the first direction, the upper silicon steel sheet (31) comprises a first part around which the upper coil (3) is wound, and second parts positioned at both ends of the first part in a third direction vertical to the first and second directions respectively and extending from the first part downwards, the lower silicon steel sheet (41) comprises a first part around which the lower coil (4) is wound, and second parts positioned at both ends of the first part in the third direction respectively and extending from the first part upwards, the upper concentrating flux plate (21) faces the upper coil (3), the lower concentrating flux plate (22) faces the lower coil (4), and the center line of the magnet (2) and the center line of the stator part are located on the same straight line extending in the first direction, tip parts of the second parts of the upper silicon steel sheet (31) are arranged at both sides of the rotor part in the third direction respectively, and tip parts of the second parts of the lower silicon steel sheet (41) are arranged at both sides of the rotor part in the third direction respectively.

2. The motor of claim 1, wherein the upper shell (5) and the lower shell (6) are cooperatively provided with a bearing groove A and a bearing groove B, a bearing A (14) and a bearing B (15) are arranged on the rotor part, the bearing A (14) and the bearing B (15) are respectively installed in the bearing groove A and the bearing groove B, in order to install the rotor part in the enclosure in a rolling manner.

3. The motor of claim 2, wherein the upper coil assembly comprises an upper reel A (32) and an upper reel B (33), the upper reel A (32) and the upper reel B (33) clamp the upper silicon steel sheet (31) therebetween, the upper coil (3) winds and fixes the upper reel A (32), the upper reel B (33) and the upper silicon steel sheet (31) into an entirety, the lower coil assembly comprises a lower reel A (42) and a lower reel B (43), the lower reel A (42) and the lower reel B (43) clamp the lower silicon steel sheet (41) therebetween, and the lower coil (4) winds and fixes the lower reel A (42), the lower reel B (43) and the lower silicon steel sheet (41) into an entirety.

4. The motor of claim 3, wherein the rotor part comprises a fixing shaft (1), a connecting element A (11), and a connecting element B (12), the fixing shaft (1) is fixedly connected with the connecting element A (11), the upper concentrating flux plate (21) and the lower concentrating flux plate (22) are fixedly arranged between the connecting element A (11) and the connecting element B (12), and the elastic element (13) is arranged at the tail end of the rotor part.

5. The motor of claim 4, wherein the upper coil (3) and the lower coil (4) will generate a magnetic field after the current is switched on, when the switched-on current changes, a changing magnetic field will be generated to interact with the magnet (2), so as to drive the rotor part to move.

6. The motor of claim 5, wherein the center line of the magnet (2) and the center line of the fixing shaft (1) are located on the same straight line.

7. The motor of claim 6, wherein the circuits of the upper coil (3) and the lower coil (4) are connected in series or in parallel, and the directions of magnetic lines generated by the upper coil (3) and the lower coil (4) are uniform.

8. The motor of claim 7, wherein the frequency at which the current is switched on to the upper coil (3) and the lower coil (4) is equal to or close to the resonance frequency of the rotor part.

* * * * *